United States Patent [19]

Spika

[11] 3,713,648
[45] Jan. 30, 1973

[54] CONVEYOR FOR CARDS AND THE LIKE
[75] Inventor: Wolfram Spika, Sparta, N.J.
[73] Assignee: Bobst Champlain, Inc., Roseland, N.J.
[22] Filed: Sept. 14, 1970
[21] Appl. No.: 71,890

[52] U.S. Cl..................................271/79, 198/180
[51] Int. Cl. ................................................B65h 5/14
[58] Field of Search ............271/79, 82, 48; 198/180

[56] References Cited

UNITED STATES PATENTS

| | | | |
|---|---|---|---|
| 1,329,936 | 2/1920 | Spiess | 271/79 |
| 2,638,342 | 5/1953 | Luehrs | 271/48 |
| 2,549,145 | 12/1970 | Trautmann | 271/79 |
| 3,071,374 | 1/1963 | Trumbull | 271/79 |
| 3,261,522 | 7/1966 | Auer et al | 225/1 |
| 930,737 | 8/1909 | Davis | 198/180 X |
| 2,773,585 | 12/1956 | Caulfield | 198/180 |

Primary Examiner—Evon C. Blunk
Assistant Examiner—Bruce H. Stoner, Jr.
Attorney—James and Franklin

[57] ABSTRACT

A conveyor comprises an elongated element on which are arranged a plurality of openable and closable grippers. As the conveyor moves along its path it is acted upon by control means acting on the grippers to cause them to open and close at appropriate times. These control means are located at appropriate operating stations for the conveyor system as a whole, for example, at stations where the objects to be conveyed are inserted into the conveyor, where they are released from the conveyor, where undesired objects may be rejected, and where the alignment of objects carried by the conveyor may be corrected or optimized. As specifically disclosed, the control means is incorporated into a rotatable element over which the elongated element passes. That rotatable element is provided with a plurality of radially outwardly projectable parts which, when they come opposite the grippers on the conveyor means, are effective to cause the grippers to open or close depending upon whether those parts are outwardly or inwardly positioned. The positioning of the parts is determined by a cam, preferably adjustable positionable, with respect to which the parts are moved by the rotatable element as the conveyor system operates.

14 Claims, 13 Drawing Figures

INVENTOR
WOLFRAM SPIKA
BY James md Franklin
ATTORNEY

INVENTOR
WOLFRAM SPIKA
BY James and Franklin
ATTORNEY

INVENTOR
WOLFRAM SPIKA
BY James and Franklin
ATTORNEY

CONVEYOR FOR CARDS AND THE LIKE

The present invention relates to a conveyor particularly well adapted for high-speed operation and for the gripping and conveying of small, light objects, such as computer cards. The invention as here disclosed is specifically designed for use with such cards, but it will be apparent that its scope of applicability is not limited thereto.

It is common in manufacturing operations that objects delivered to a given station must be moved from that station to another station. Many conveyor systems are available for use with objects that are sturdy and heavy; with such objects the retention thereof on the conveyor usually does not pose particular problems. However, in many instances the articles to be conveyed are light and flimsy, and this does present a very real conveyor problem. Because they are light, they do not tend to follow a conveyor rigidly, and hence moving of a light object from one place to another requires that the object be firmly gripped. However, because the object is relatively flimsy, the gripping cannot be too strong; if it were, it would damage the object. In addition, even in connection with sturdier products, it is often necessary that an object be undisturbed while it is being conveyed. For example, if the object has had intelligence printed thereon with ink or some other substance, that ink must be given time to dry before the object is abraded at all. If this is not done, the ink will blur and the object will be defective.

In addition, the smaller and flimsier the object to be conveyed, the more difficult it is to move that object into operative engagement with the conveyor and to remove it from the conveyor without any damage to the object. This is a factor not only because of the size and fragility of the object, but also because the space between the delivery station and the gripping station is necessarily small — it cannot be greater than the size of the object itself or else some additional conveying mechanism would be required — and therefore it is difficult to have properly and positively acting insertion and removal mechanism operative within such a short space.

Another problem present in many conveyor systems is that not all of the objects associated with those systems are to be conveyed thereby through the full length thereof. Rejects, when detected, are to be removed from the train of objects which is being conveyed. Therefore means must be provided for ejecting undesired objects from the conveyor, and this ejecting means must be accurately operative so that so far as possible only the reject is affected.

In many instances conveyor systems are associated with other operating assemblies which perform operations on the objects which the conveyor carries. It is often very important that the conveyor deliver the carried objects to the associated equipment in a precise orientation, so that the operation performed by that associated equipment can be accurately carried out. In these instances it is not enough that the object be carried and conveyed; it is necessary that when it is carried it be oriented and located in a precise fashion.

High speed of operation of conveyor equipment is often an industrial requisite. Desirable, particularly when high speed operation is involved, is a mechanism the speed of which can be readily changed from time to time to conform to differing plant or production requirements. In such a case it is exceptionally important that operation of the conveyor and of the various gripping and releasing functions performed by the conveyor on the objects conveyed thereby are readily synchronized with the speed of operation of the system as a whole, so that individual adjustment of the various operating parts need not be carried out each time that the speed of operation of the system is changed.

The above problem, one or more of which are present in almost every conveying application, are all present, and to a marked degree, in connection with the conveying of printed computer cards from the printer to a storage station or to a station where certain additional operations, such as the cutting of oblique corners on the cards, are carried out. These cards are printed in very large quantities, usually from continuous strip stock, after which they are cut into individual cards are conveyed to a station where the oblique corner is cut. Not only must they be conveyed positively from one operating station to another, but they must be conveyed in a manner such that the fresh printing on the cards is permitted to dry before the cards are disturbed. The oblique corner must be cut very accurately, because that corner functionally relates with equipment in which the computer cards are to be used. Only those cards free of defects can be used, and means must be provided for ejecting and discarding defective cards.

In the past apparatus have been provided for conveying computer cards through a printing station to a cutting and receiving station. One type of such apparatus is shown in Carroll U.S. Pat. No. 2,294,728, and a specific embodiment thereof is shown in Auer et al U.S. Pat. No. 3,261,522 of July 19, 1966, entitled "Apparatus for Making Business Machine Cards with Round Corners," assigned to the assignee of this application. That apparatus functioned very well in connection with the manufacture of standard size computer cards. However, more recent developments in the computer field have led to the use of a much smaller computer card, having a length of approximately 3¼ inches and a width of approximately 2¾ inches (as compared with a length of 7⅜ inches and a width of 3¼ inches for the earlier larger cards). The equipment used for conveying the larger cards, although effective for that purpose and capable of operation at relatively high speeds, proved entirely inadequate for the conveying of the small cards, because of the problems outlined above. The apparatus of the instant invention was designed in order to handle the small computer cards as they came from the printing and cutting apparatus, and to convey those cards at high speed to a station where the oblique corners are cut thereon and the cards are then stacked for subsequent use. As has been mentioned, although the apparatus was specifically designed for use with such small computer cards, and it is therefore here specifically disclosed in conjunction with that type of operation, the conveyor apparatus in its broader aspects is applicable to the conveying of many other and different types of objects.

The prime object of the present invention is to devise a conveyor apparatus which is capable of reliably gripping, conveying and releasing objects, and particularly light and relatively flimsy objects.

It is a further object of the present invention to devise such an apparatus which is particularly well adapted for use in the conveying of relatively fragile or easily damaged articles.

It is another object of the present invention to devise such an apparatus which is capable of operation at high speeds, and which will present the objects carried thereby in a position accurately oriented relative to the conveyor, so that subsequent operations can be performed on those objects with a very high degree of accuracy.

A further object of the present invention is to devise such an apparatus in which the speed of operation thereof can be varied widely in a simple manner and without requiring any special adjustments for the operating parts of the conveyor, the conveyor system being inherently self-synchronized.

Yet another object of the present invention is to provide a conveyor system of the type involved in which individual conveyed objects can be ejected from the train of conveyed objects without disturbing the other objects in the train.

Accordingly, in the apparatus of the present invention, the conveyor comprises an elongated conveyor element such as a sprocket chain on which a plurality of article-grippers are serially arranged, each of those grippers having an operating element adapted to be actuated to cause the gripper to open. Means are provided on the gripper, usually in the form of a spring, for maintaining the gripper closed with an appropriate force. The conveyor element is, as is conventional, guided along a desired path from the station where objects are inserted into the conveyor to a station where objects are released from the conveyor, the conveyor element then continuing back to the insertion station. Other operative stations besides the insertion and release stations may be provided along the conveyor path. One such station may be a reject station, where desired individual objects can be removed from the conveyor. Another such station may be an object aligning station, at which accurate orientation of the object carried by the conveyor relative to the conveyor is accomplished. At each of those operating stations where the gripper is to be actuated, control means are provided, that control means being adapted to cooperate with the individual operating elements of the grippers as they move along that station, those operating elements being positively moved so as to control whether the gripper is open or closed, and precisely when.

The control means, in the form here specifically disclosed, comprises a rotatable element such as a sprocket wheel which is operatively associated with the sprocket openings in the conveyor element as the latter moves over the wheel. The wheel carries a plurality of generally radially movable control parts which are acted upon by a preferably stationary cam with respect to which the rotatable element moves, the cam being shaped so as to cause the control parts to move outwardly and inwardly at the desired segments of their path of movement with the rotatable element, thereby to actuate the grippers with which they come into operative engagement. The position of the cam relative to the rotatable element which carries the control parts is preferably adjustable, so that the timing of the opening and closing of the grippers can readily be modified to suit desired operation conditions.

For reject purposes the cam will normally be positioned so that the control parts are projected radially outwardly (this corresponding to gripper opening) only when they are not in operative engagement with the conveyor-carried grippers, but when rejection of a particular object is desired, that cam is shifted at the moment that the particular object is in the reject station, thereby to cause the control part at that moment operatively associated with the gripper carrying the particular object to move to open that gripper, thereby releasing the object. Thereafter the cam will resume its normal position and the next object will therefore be retained by its gripper and will remain on the conveyor.

At an object aligning station guides may be provided alongside the path of movement of the conveyor, and while a given gripper passes along those guides the cam active on the control member part operatively associated with that gripper will move that part so as to cause its gripper to open and then close. While the gripper is open the object carried thereby engages the guides and is accurately oriented, then again being grasped by the gripper when the latter closes.

At the release station the gripper may carry its associated object in a trailing fashion and bring that object up against a positive stop. Further movement of the gripper will then cause the gripper to pull away from the object, thus stripping the object from the conveyor.

To the accomplishment of the above, and to such other objects as may hereinafter appear, the present invention relates to the construction and mode of operation of a conveyor system and of parts used therein, all as defined in the appended claims and as described in this specification, taken together with the accompanying drawings, in which:

GENERAL DESCRIPTION

Figure 1:
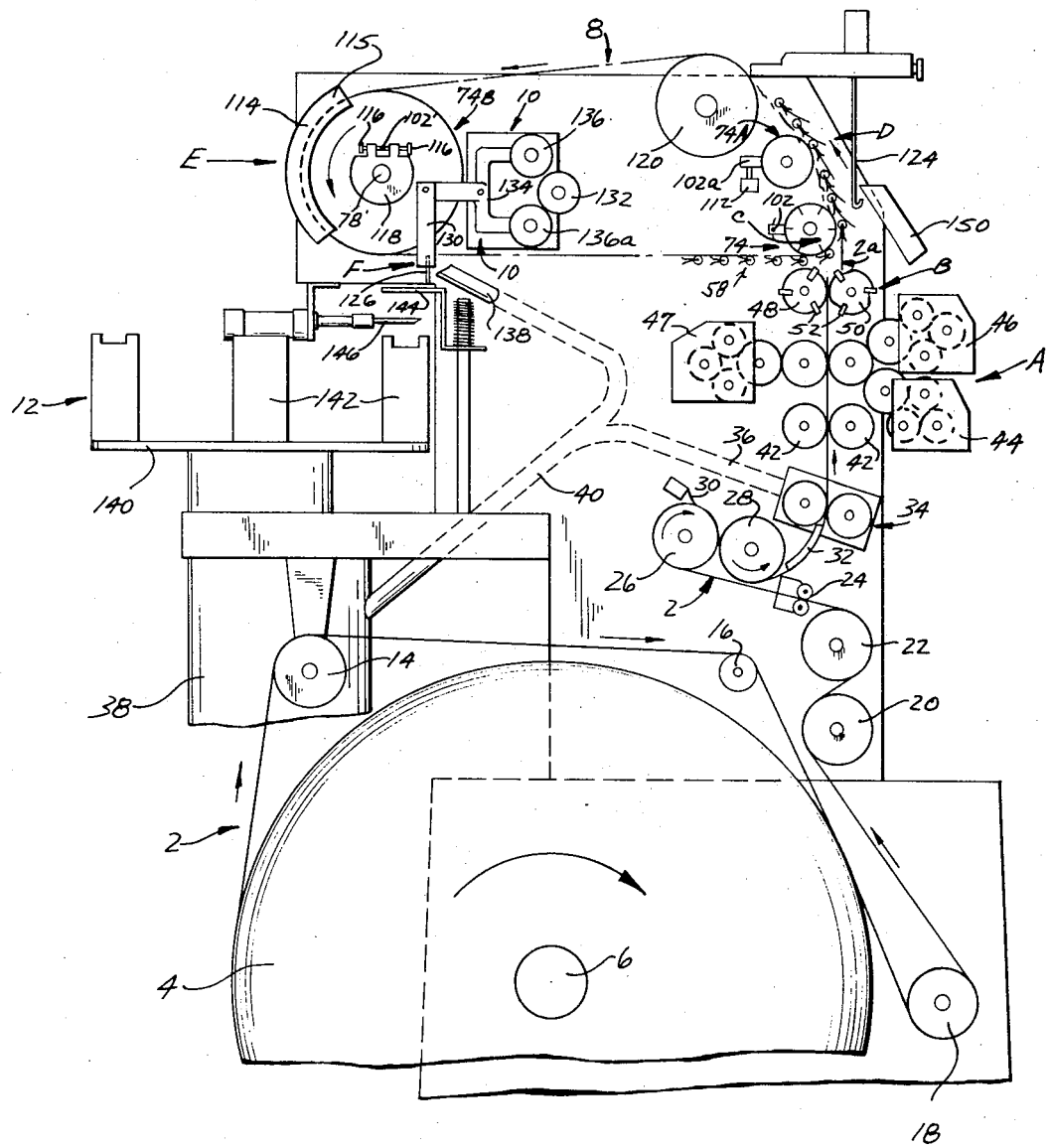
FIG. 1 is a side elevational view of an apparatus designed for printing and cutting the computer cards and embodying the present invention.

The card printing and cutting machine in which the conveying system of the present invention is embodied is shown generally in FIG. 1. It is designed to cut and print at high speed a large number of cards adapted for use with computers and the like, those cards being formed from continuous card stock generally designated 2 initially provided in reel form, the reel 4 being mounted on a reel stand 6. The reel stock 2 is unreeled from the reel 4, is printed at the station A on one or both sides, as desired, and by any desired form of printing, is cut at station B into individual cards, generally designated 2a, which at insertion station C, located very close to cutting station B, are inserted into a conveyor generally designated 8. The cards 2a are carried by the conveyor 8 past a reject station D where rejects are expelled from the conveyor, the non-rejected cards then being carried by the conveyor to a station E where the alignment or orientation of those cards relative to the conveyor 8 is refined and adjusted. Thereafter the conveyor 8 conveys the cards to an ejection or release station F, at which station the cards are acted upon by a corner-cutting mechanism 10. From there the cards are deposited in a stacking device generally designated 12, from which they can be removed as desired.

Now following the path of the strip material 2 more in detail, that strip material, as it leaves the reel 4, passes over a swivel roller 14, an idler roller 16 and a dancer roller 18, the latter floating and therefore maintaining uniform unwind tension on the strip 2, as is well known. From the dancer roller 18 the strip 2 passes over a pair of additional idler rollers 20 and 22 to the motor driven decurler assembly 24, that assembly, in known fashion, having rollers which are driven over the surface of the strip 2 at a speed and with a tension such as to ensure that the cut cards 2a lie flat and do not curl. The operation of the decurler 24 is controlled by apparatus later to be described.

From the decurler 24 the strip 2 passes over driven rollers 26 and 28, those rollers providing the motive force which draws the strip material from the reel 4 and feeds it toward the printing station A and the cutting station B. A wire brush 30 operates, in conjunction with one of the drive rollers 26, to detect discontinuities, such as pin holes or lime spots, in the strip material 2. If any such discontinuities are detected, appropriate mechanism at the reject station D is actuated at an appropriate time in order to expel the defective material from the series of cards 2a carried by the conveyor 8.

Figure 2:
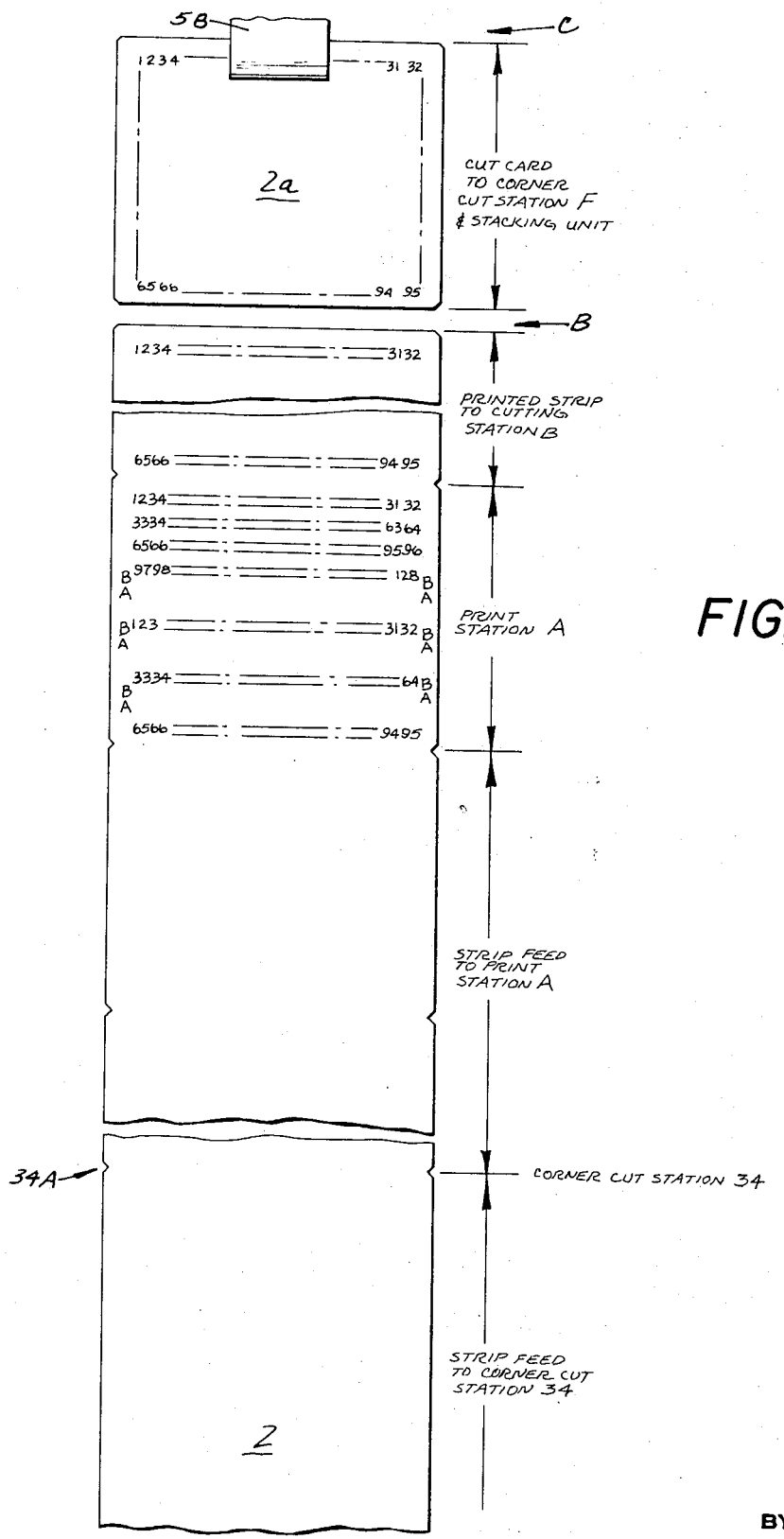
FIG. 2 is a developed fragmentary view showing the operations performed on the strip material of which the cards are formed up to the time that individual cards are formed and inserted into the conveyor.

From the driving roller 28 the sheet 2 passes over radius guide 32, which exerts a slight drag on the strip 2, and from there sheet 2 passes through the corner cut assembly 34 which, as the sheet 2 passes therethrough, notches the edges of the sheet 2, as indicated at 34a in FIG. 2. The scrap produced by the corner-cutting assembly 34 is sucked up by vacuum pipe 36 which communicates with vacuum unit 38 via pipe 40, the scrap thereby being conveyed away from the operating areas of the apparatus.

From there the strip 2 passes between a pair of driven feed rollers 42 and up into the printing station A. As here specifically disclosed that printing station A is provided with three offset printing units 44, 46 and 47, the units 44 and 46 printing on one face of the sheet 2 and the unit 47 printing on the other face thereof, thus enabling two-color printing to be provided on said one face and one color printing to be provided on the other face. It will be appreciated that this is by way of exemplification only and the other arrangements and types of printing apparatus could be employed.

Figure 5:
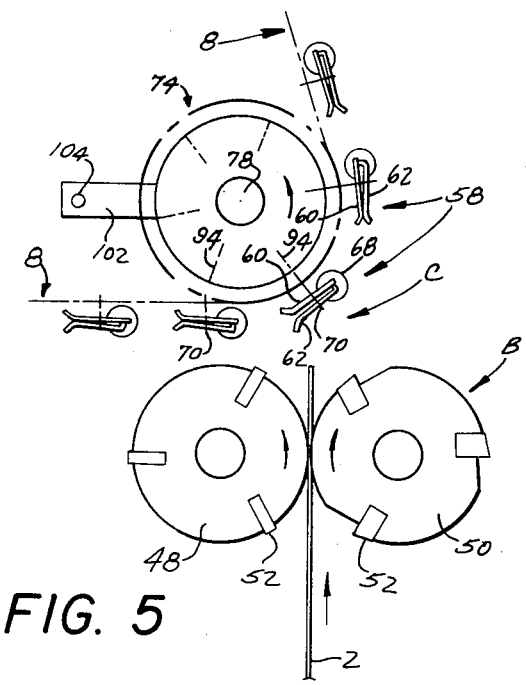
FIGS. 5 – 8 are schematic views showing the sequential action of the cutters and grippers at the cutting and insertion stations.
Figure 7:
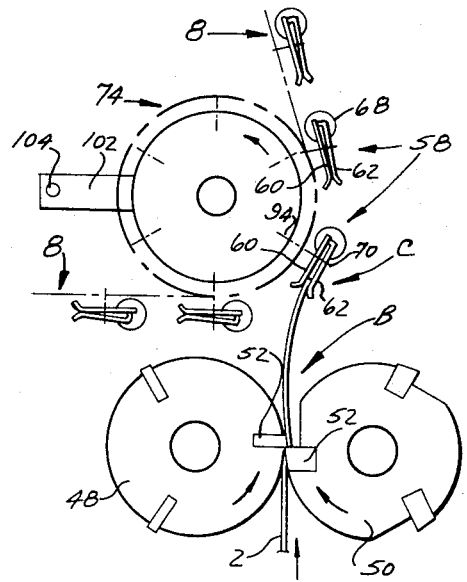
Figure 6:
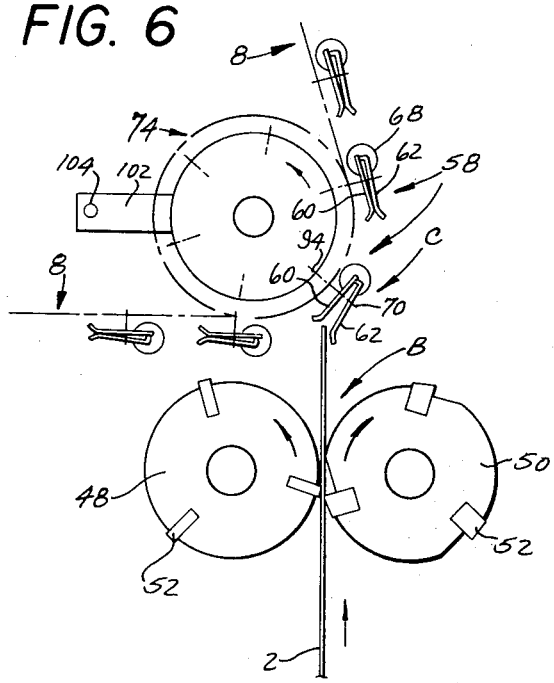
Figure 8:
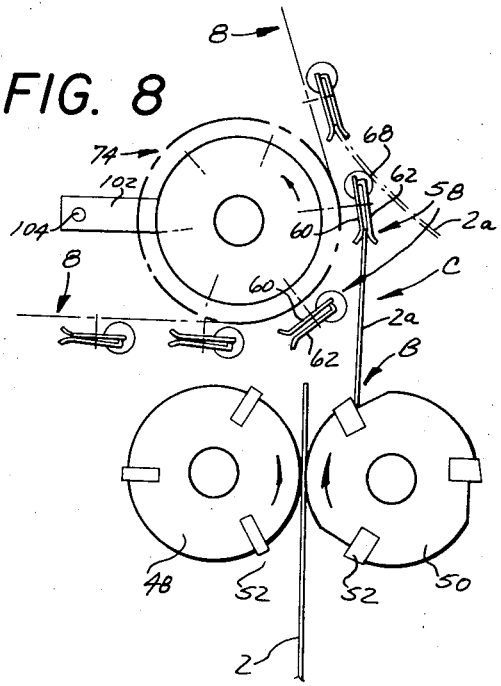

From the printing station the sheet 2 moves up between the rotary cutting elements 48 and 50, those elements being provided with cooperating knives 52 which serve, after the strip 2 has been fed up beyond the knives an appropriate distance, to sever the leading portion of the strip from the remainder of the strip, thereby to produce an individual card 2a. The operation of the rotary cutting element 48 and 50 and their knives 52 is clearly illustrated in FIGS. 5 – 7, FIG. 5 illustrating an intermediate position of the elements 48 and 50, with a portion of the card-to-be-formed projecting up thereabove, FIG. 6 indicates the position of the parts just before cutting is effected, the knives 52 almost in cutting position and the entire length of the card-to-be-formed extending thereabove, FIG. 7 shows the position of the parts when cutting has just been completed, the two knives 52 having now severed the card 2a from the remainder of the strip 2, and FIG. 8 shows the position of the cards corresponding to that of FIG. 5 for the next cycle of operation.

THE CONVEYOR

The conveyor 8 is shown here essentially in the form of a sprocket chain formed, as is conventional, by a series of open links connected by pivot pins 56. It departs from conventionality in being of greater width than usual. A plurality of article-grippers generally designated 58 are mounted on the conveyor 8 spaced therealong in the direction of its length, and the chain is made extra-wide in order to provide adequate lateral support for the grippers 58 carried thereby. Hence, as may be seen from FIG. 4, the chain 8 is of triple width, composed of three pairs of links 54 side-by-side, with the pivot pins 56 passing through all of them. The chain 8 is continuous in nature, and is made of such a length as to correspond to the length of the path it must travel, all as is conventional.

The grippers 58 comprise a pair of jaws 60 and 62 between which the objects to be conveyed, here the cut cards 2a, are adapted to be grasped. The bottom jaw 60 is positioned over the top of the chain 8 at an appropriate position along its length. It is mounted on the chain 8 by means of laterally and downwardly extending portions 64 which extend down alongside the edges of the chain 8. Those portions 64 are provided with apertures through which the pins 56 pass. A pair of longitudinally spaced pins 56 pass through each portion 64 (See FIG. 3), and as a result the jaw 60 is firmly mounted on the chain 8, but without appreciably inhibiting the flexibility of that chain.

The upper surface of the jaw 60 is provided with a recess 66 (See FIG. 3) into which the downwardly turned rear end 67 of jaw 62 is received, thereby to pivotally mount the jaw 62 on the jaw 60. A cylindrical spring 68 has its ends engaged in appropriate indentations in the jaws 60 and 62 forwardly of the recess 66 in jaw 60, and the body of the spring 68 extends around the rear ends of the jaws 60, 62, thus acting to pivot jaw 62 around the point of engagement between its downwardly turned rear end 67 and jaw 60 to a gripping position in which its front end engages jaw 60. The leading tips of the jaws 60 and 62 may be flared, as shown, in order to facilitate the entry of cards 2a between the jaws.

In order to move the jaw 62 away from the jaw 60 to gripper-open position against the action of the spring 68, the jaw 62 is provided with an operating element 70 in the form of a pin extending down from jaw 62 between its ends and passing through aperture 72 in jaw 60 and between links 54 and pins 56 in the chain 8, thereby to be accessible from the bottom of the chain 8 for actuation.

Actuation of the operating elements 70 to open and close the grippers 58 as desired is accomplished by control means provided at appropriate operating stations where the grippers 58 are to be opened and closed. This control means is located on the inside of the continuous path over which the conveyor chain 8 moves, the grippers 58 and the articles carried thereby being located on the outside of the chain 8. It is often important that the timing of the opening and closing of the grippers 8 be very accurately accomplished, and this necessitates very precise positioning of the grippers 58 relative to the control means. This is very difficult to accomplish with ordinary mechanism, such as fixed cams past which the chain 8 moves. Stretching or ballooning of the chain or of segments thereof, particularly prevalent during high speed operation of the conveyor, may cause slight variations in timing, or incomplete gripper opening, which will seriously adversely affect the overall operation of the system.

Accordingly, in accordance with the present invention the control means for actuating the grippers 58 are incorporated into sprocket wheels over which the chain 58 passes. Because these sprocket wheels, by their very nature, positively positionally engage with the chain 58, and because the chain 58 is tensioned onto the sprocket wheel while they move therearound, the interengagement between the control means and the gripper operating elements 70 is reliably effected.

Figure 3:
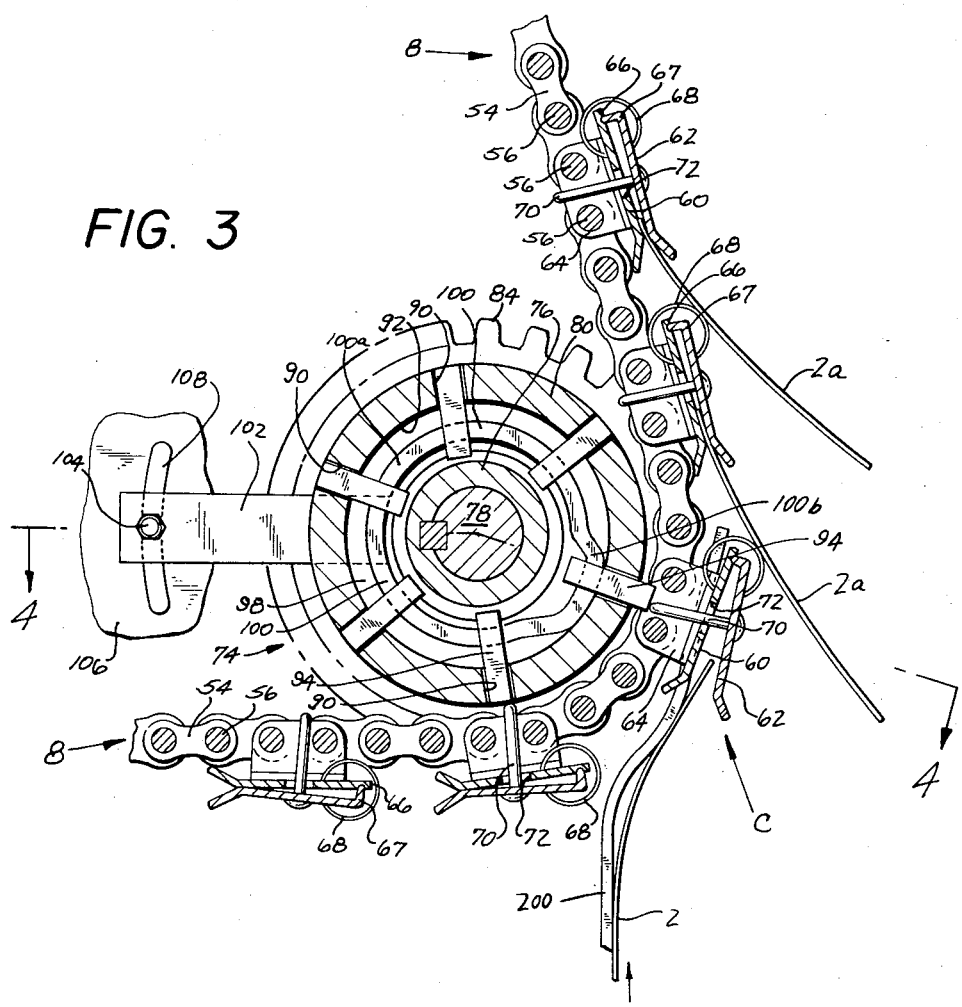
FIG. 3 is a cross-sectional view on an enlarged scale of the lower right-hand sprocket wheel in the conveyor system of FIG. 1, together with parts associated therewith, the view being taken along the line 3—3 of FIG. 4.
Figure 4:
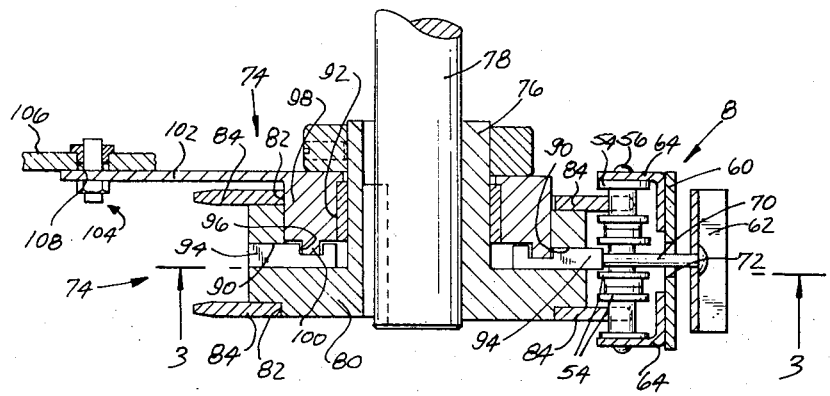
FIG. 4 is a cross-sectional view taken along the line 4—4 of FIG. 3.
Figure 9:
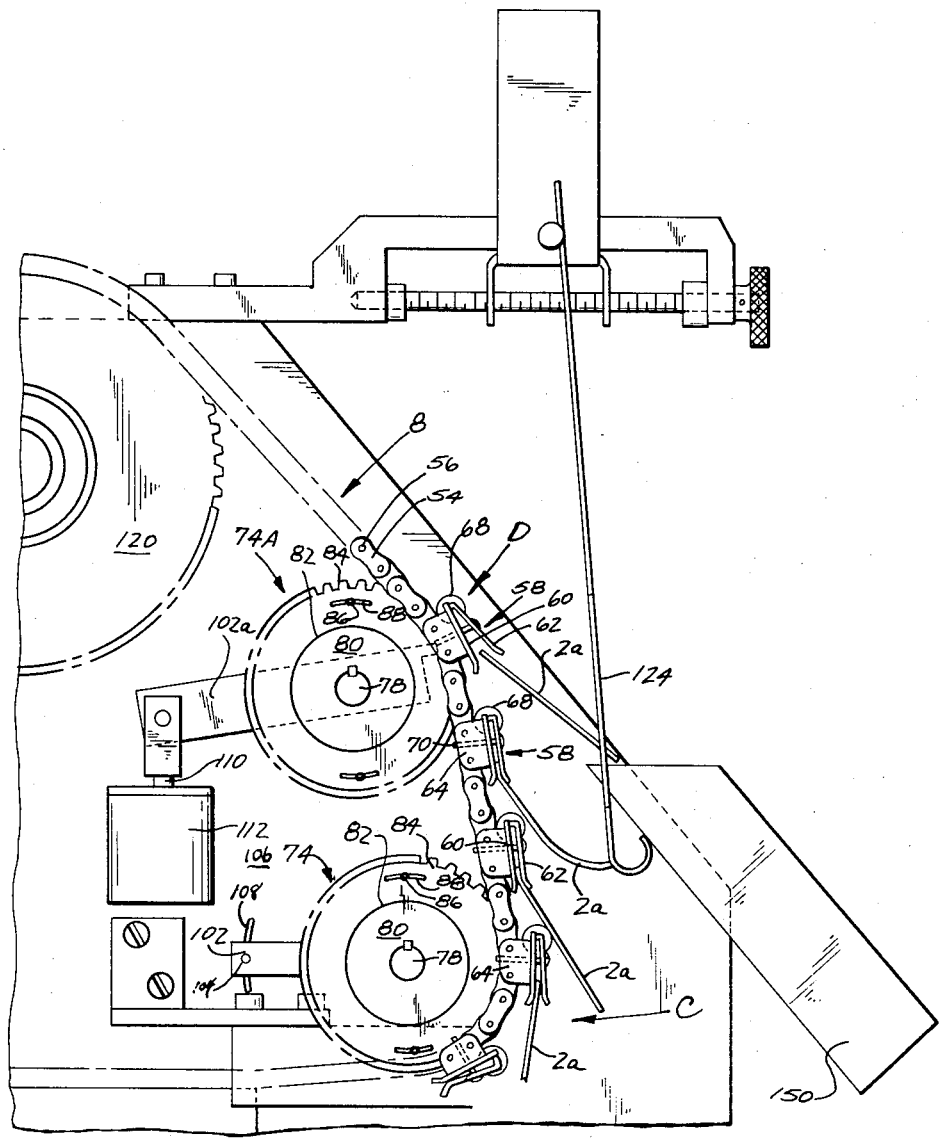
FIG. 9 is a front elevational view, on an enlarged scale, of the right-hand portion of the conveyor system shown in FIG. 1.

One sprocket wheel into which a gripper-actuating control means is incorporated is the sprocket wheel 74 located at the insertion station C, that sprocket wheel being illustrated in detail in FIGS. 3 and 4. It comprises a hub 76 keyed to shaft 78, the hub 76 carrying the mounting body 80 provided with corner recesses 82 in which sprocket gears 84 are fixed, preferably adjustably (as by means of the clamping screws 86 passing through slots 88, as shown in FIG. 9). A plurality of radially extending channels 90 are formed in the body 80, extending from points on the periphery thereof axially between the sprocket gears 84 radially inwardly to a chamber 92 which opens out axially to one side of the body 80. Rod-like parts 94 are received in the channels 90, the inner ends of those parts being provided with notches 96. A cam support 98 is received in the chamber 92, and it is provided with a cam track in the form of a projection 100 which is received in the notches 96 formed in the parts 94. The shape of the cam track 100 can best be seen in FIG. 3. It comprises radially inwardly disposed section 100a and radially outwardly disposed section 100b, the radial spacing of those sections being such as to cause the parts 94, as their notches 96 come into engagement with the respective sections 100a and 100b, to be retracted and outwardly projected respectively. The cam support 98 does not rotate with the body 80; it and the chamber 92 in which it is received are circular in plan shape, thereby permitting the body 80 with its sprocket gears 84 to rotate while the body 98 is held stationary (or, if desired, otherwise independently moved). As here shown, the body 98 of sprocket assembly 74 extends axially beyond the body 80, and then is provided with a laterally extending arm 102 which, at 104, is fixed to some portion 106 of the chassis of the apparatus.

The circumferential spacing between the channels 90 and their respective parts 94 corresponds with the spacing of the grippers 58 along the chain 8, each operative part 94 adapted to be brought into registration with the operating member 70 of a given gripper 58 and, when the part 94 is outwardly projected while it is thus in registration with a gripper operating member 70, is active to force open that gripper 58 by moving the operating member 70 outwardly. Hence the radial projection of the cam section 100b will be sufficient to accomplish that result, and its circumferential extent will be such as to cause the grippers 58 to stay open at the particular station involved for the length of time and over the particular segment of its path of travel desired. In order to permit fine adjustment of the precise location of that segment, the chassis portion 106 to which the arm 102 is secured is provided with a slot 108 with which the clamping screw 104 cooperates. Shifting of the clamped position of the arm 102 along the slot 108 will cause rotative shifting of the cam section 100b, and hence will control the precise locations where the parts 94 move radially out and in.

The construction of the sprocket assembly 74A at the reject station D, and its mode of operation, is essentially the same as that of sprocket assembly 74, except that its arm 102a, instead of being fixed to the chassis, is instead connected to armature 110 of electromagnet 112 fixed to the chassis. The armature 110 is normally withdrawn into the electromagnet 112, as shown in FIG. 9, and in that position the arm 102, and with it the cam support 98 and cam track 100, are so rotated that the radially outwardly displaced cam section 100b is located opposite a portion of the circumference of the cam assembly which is not in engagement with the sprocket chain 8. Hence as the chain 8 passes over the assembly 74A while the latter is in this condition its grippers 58 will remain closed. However, when the electromagnet 112 is energized the armature 110 is projected outwardly, the arm 102 is swung counterclockwise as viewed in FIG. 9, and the cam support 98 and cam track 100 are rotated relative to the sprocket assembly 74A until the outwardly extending arm track section 100b comes opposite that portion of the circumference of the sprocket assembly 74A which is engaged by the sprocket chain 8. As a result the gripper 58 moving around the sprocket assembly 74A at that moment will be opened. The grippers passing around sprocket assembly 72A will continue to be opened until the electromagnet is deenergized, after which the parts will return to their positions shown in FIG. 9 and the grippers 58 will remain closed as they pass the assembly 74A.

The sprocket assembly 74B at the object aligning station C is operationally the same as the sprocket assemblies 74 heretofore described except that the arcuate extent and location of the outwardly extended cam track section 100b is such as to correspond to the arcuate extent and location of the guide plates 114 located along opposite sides of the chain 8 and adapted to receive the gripper-carried cards 2a therebetween. Hence as the grippers 58 move between the guide plates 14 they are opened, and then they are closed before they move beyond the plates 114. Constructionally, the sprocket assembly 74B is larger than sprocket assemblies 74 and 74A, it may be powered to function as the drive sprocket for the chain 8, and adjustment of the rotative position of the cam support 98 and the cam track 100 carried thereby is accomplished by the arm 102' received between adjusting screws 116 carried on a stationary bearing support 118 in which the shaft 78' of the assembly 74B is journalled.

The chain 8, in addition to passing over the sprocket assemblies 74, 74A and 74B in which gripper control means are incorporated, also passes over idler sprocket 120 and Nylon guide rods 122. A feeler 124 is located with its tip in a position to be engaged by the cards 2a as they are carried by the grippers 8, the feeler 124 therefore detecting the degree to which those cards may be curled and actuating the decurler 24 to produce in the finished product the desired degree of straightness.

RELEASE AND CUTTING OPERATIONS

Figure 10:
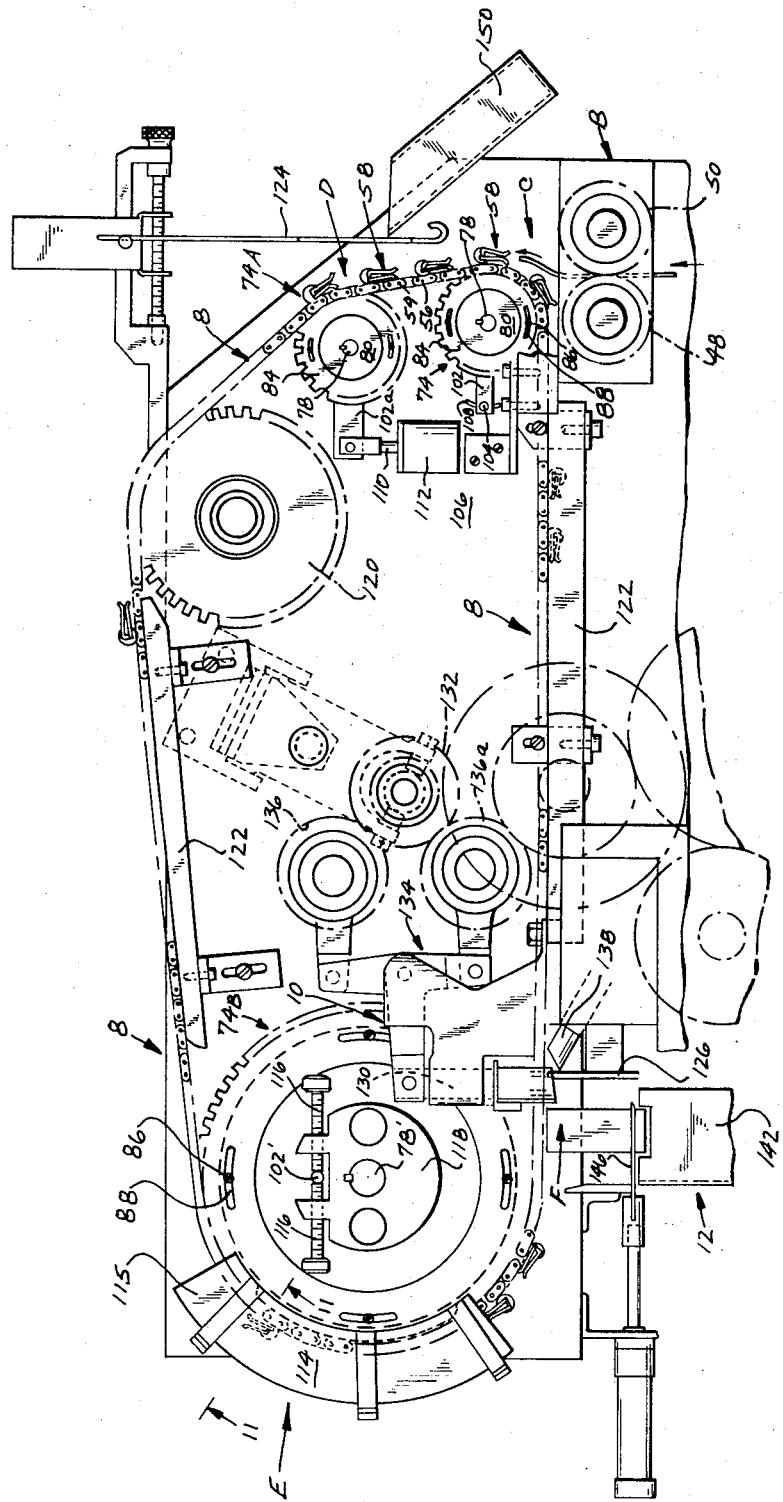
FIG. 10 is a side elevational view of the conveyor system per se, shown more in detail than in FIG. 1.

As may perhaps best be seen in FIG. 10, as the grippers 58 leave the aligning station E and the sprocket assembly 74B they face rearwardly, so that as they move from left to right as viewed in the drawing the cards 2a carried thereby extend therefrom in a leftward or trailing direction. The grippers 58 are moved by the chain past a positive stop member 126 which is fixed in position. The leading edges of the cards 2a engage the stop member 126, the movement of the card 2a to the right is arrested, the gripper 58 continues to move to the right, and the gripper 58 is thus caused to slide off from the card 2a, thereby removing the card 2a from the conveyor.

Figure 13:
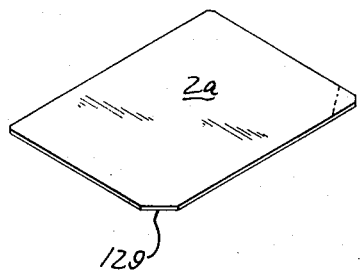
FIG. 13 is a three-quarter perspective view of the finished card as it leaves the apparatus.

The mechanism for forming an oblique corner on the card 2a then becomes operative on the card 2a just stripped from the conveyor 8. It comprises a fixed anvil or blade 128 on which the card 2a rests and a movable cutter blade 130 normally positioned above the fixed blade 128 and movable down past fixed blade 128 in order to sever the corner portion of the card 2a from the body of that card. Normally one corner or the other, or both, are to be excised to form an oblique corner 129, (See FIG. 13) and hence two sets of fixed and movable blades are provided, and one or both of the movable blades is actuated. For actuating the movable blades 130 a drive gear 132 is provided which is controllably clutched by shift mechanism 134 to one or the other or both of a pair of eccentrics 136 and 136a, those eccentrics in turn actuating one corner cut movable blade 130 or the other or both. The timing is preferably such that the cutting action is performed as soon after the card 2a is stripped from the conveyor 8 as possible, thereby to maximize accuracy in the shaping of the oblique corner. The scrap from the cutting operation is sucked away by suction tubes 138 which communicates with pipe 40 and vacuum unit 38.

After the card 2a has been corner-cut it falls into the stacking device 12, which may be of any desired construction. As here shown it comprises a turret 140 indexed around in any desired manner so as to sequentially present individual stack guides 142 to the cutting station F. As cards are cut they fall into the guide 142 then in position. A spring loaded stack support plate 144 may be provided to keep the uppermost card in the stack always near the top of the stack, the plate 144 moving downwardly in response to the weight of the cards 2a stacked thereabove. When the turret 140 is indexed the plate 144 swings out from one stack guide 142 and into the next guide 142 brought into operative position. During that indexing movement a card interceptor 146 is projected to a position under the cards 2a as they fall from the cutting station F, thereby supporting those cards which are cut while the turret 140 is being indexed. After turret indexing is completed the card interceptor 146 is withdrawn and the cards supported thereby are permitted to fall into the newly presented guide 142. The finished stacks of cards 2a are removed from the stacking device manually or in any other desired manner.

CONVEYOR OPERATION

The timing and synchronization of the individual card formation at the station B and the insertion of the thus-formed cards into the conveyor 8 is particularly difficult because of the small size of the cards, their fragility, the fact that they have just been imprinted and the ink has not yet had time to dry, the small space provided for transfer of the cards, and the high speed at which the assembly must operate. Consequently the opening and closing of the grippers 58 and the feeding of the cards 2a at the insertion station C must be very strictly controlled. The sequence of operations at this station may best be seen from FIGS. 5–8. The operative gripper 58 is opened just before the leading edge of the card-to-be-formed reaches it, and just before the card is cut by the cutter blades 52. The leading edge of the card is guided into the open gripper 58 by guide 200 (see FIG. 3). Just as the blades 52 perform their cutting action, thus separating the card 2a from the strip 2, the gripper 58 must close. If it does not close the card 2a, no longer supported by the strip 2 and the feeding means therefor, will fall. The gripper 58 must then move the card 2a out of the way of the next card-to-be-formed and the next gripper 58 which cooperates with the latter. This is best shown in FIG. 8, when it will be noticed that the blade 52 on cutter 50 positively moves the card 2a out of the way, and the cylindrical spring 68 on the next gripper 58 is in position to prevent the card 2a from moving back to interfere with the leading end of strip 2 as it moves up to form the next card. When it is considered that the apparatus here disclosed is designed to work with more than 4500 cards per minute, the need for positive action and precise timing will be apparent. That timing can readily be accomplished by adjusting the position of arm 102 relative to slot 108. It should be noted that when the leading edge of the card 2a enters the gripper 58 the gripper 58 is open, and hence there is no smudging of the printing which is still wet on the card. When the gripper 58 closes it grips the card 2a only along a line, and hence the possibility that the printing might be marred is further minimized.

The cards 2a carried by their respective grippers 58 leave the sprocket assembly 74 at the insertion station B and move on to sprocket assembly 74A at rejection station C. Early in the travel through the apparatus of the strip section which became the card 2a it passed through a defect or discontinuity detector (the wire brush 30 previously described). If a defect was detected at that time, a suitable memory or timing apparatus synchronized with the speed of operation of the apparatus will energize the electromagnet 112 just at the time that the particular defective card 2a is carried by a gripper that is passing over sprocket assembly 74A. Hence that gripper 58 is opened, the card 2a carried thereby is released, it falls by gravity (or, if desired, assisted in some manner, as by a blast of air) into reject chute 150 (see FIG. 9), and is thus removed from the train of cards 2a carried by the conveyor 8.

Figure 11:
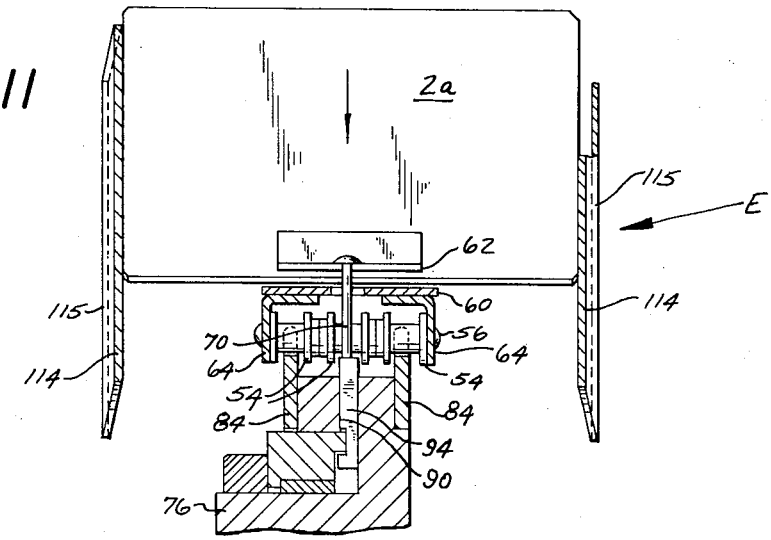
FIG. 11 is a cross-sectional view, taken along the line 11—11 of FIG. 10.
Figure 12:
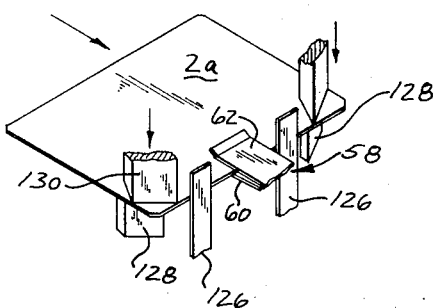
FIG. 12 is a schematic view of the station where the individual cards, after they have left the conveyor, have oblique corners cut thereon.

After the reject station D the cards 2a are carried by the conveyor 8 over a path of sufficient length, taking into consideration the speed of travel of the chain 8, so that the ink on the cards can dry. As here disclosed, either during or after the drying of the ink the cards 2a are carried to an aligning station E. This station is provided because the cards 2a must be precisely positioned relative to the cutting apparatus if the oblique corners are to be accurately formed. At this station the cards 2a, while still being carried by the grippers 58, are temporarily released in whole or in part from those grippers and at the same time they engage and are acted upon by the guiding or aligning plates 114 between which the cards 2a are carried. The leading portions of those plates 114 may be flared, as at 115 (see FIG. 11), so as to ensure that the cards 2a smoothly enter between and are laterally positioned by the plates 114. Thus as the cards 2a leave the aligning station E they are all uniformly laterally positioned relative to their respective grippers 58, and hence when they are stripped from those grippers by the positive stops 126 at the release station F they will all be uniformly positioned relative to the fixed and movable knife blades 128 and 130.

The construction, mode of operation, and advantages of the conveyor apparatus of the present invention will in the main be apparent from the above description. It will be appreciated that although only a single embodiment of the present invention has been here disclosed, that is by way of exemplification only, and that many variations may be made therein, all within the scope of the present invention as defined in the following claims.

I claim:

1. A conveyor comprising an elongated conveyor element, means for moving said element in a given direction along an operating station, a plurality of article-grippers extending from one side of said element and spaced therealong in said given direction, said grippers having operating elements which, when appropriately actuated, open and close said grippers, and control means at said operating station on the other side of said element from said grippers, engageable with said operating elements as their respective grippers move along said station, and effective to open and close said grippers as they move along said station, said moving means being effective to move said parts along a continuous closed path, said control means comprising a plurality of parts, each engageable with the operating element of a different gripper, and means operatively connected to said parts for moving them along said operating station in synchronism with their respective grippers, in which said grippers comprise a fixed part mounted on one side of said conveyor element, a movable part operatively connected to said fixed part, means operatively connected to said parts for urging them together, thereby to cause said gripper to close, and said operating element comprising a member operatively connected to said movable part, extending through said conveyor element to be exposed at the other side thereof, and there adapted to be engaged by said control means.

2. A conveyor comprising an elongated conveyor element, means for moving said element in a given direction along an operating station, a plurality of article-grippers extending from one side of said element and spaced therealong in said given direction, said grippers having operating elements which, when appropriately actuated, open and close said grippers, and control means at said operating station on the other side of said element from said grippers, engageable with said operating elements as their respective grippers move along said station, and effective to open and close said grippers as they move along said station, said moving means being effective to move said parts along a continuous closed path, said control means comprising a plurality of parts, each engageable with the operating element of a different gripper, and means operatively connected to said parts for moving them along said operating station in synchronism with their respective grippers, in which said control means comprises a rotatable element having means for engaging said conveyor element and having a plurality of generally radially movable parts carried thereby for rotation therewith, and cam means with respect to which said rotatable element rotates, said parts being operatively engaged with and moving along said cam means as said rotatable element rotates, said cam means being configured to cause said parts to move radially in and out as they thus move along said cam means, said parts in so moving actuatingly engaging said operating elements of said grippers.

3. A conveyor comprising an elongated conveyor element, means for moving said element in a given direction along an operating station, a plurality of article-grippers extending from one side of said element and spaced therealong in said given direction, said grippers having operating elements which, when appropriately actuated, open and close said grippers, and control means at said operating station on the other side of said element from said grippers, engageable with said operating elements as their respective grippers move along said station, and effective to open and close said grippers as they move along said station, in which said control means comprises a rotatable element having means for engaging said conveyor element and having a plurality of generally radially movable parts carried thereby for rotation therewith, and cam means with respect to which said rotatable element rotates, said parts being operatively engaged with and moving along said cam means as said rotatable element rotates, said cam means being configured to cause said parts to move radially in and out as they thus move along said cam means, said parts in so moving actuatingly engaging said operating elements of said grippers.

4. A conveyor comprising an elongated conveyor element, means for moving said element in a given direction along an operating station, a plurality of article-grippers extending from one side of said element and spaced therealong in said given direction, said grippers having operating elements which, when appropriately actuated, open and close said grippers, and control means at said operating station on the other said of said element from said grippers, engageable with said operating elements as their respective grippers move along said station, and effective to open and close said grippers as they move along said station, in which said control means comprises a plurality of parts, each part engageable with the operating element of a different gripper, and means operatively connected to said parts for moving them along said operating station in synchronism with their respective grippers.

5. The conveyor of clam 4, in which said conveyor element moves along a path defined in part by a peripheral portion of a rotatable element operatively engaged by said element, said control means being carried by and rotatable with said rotatable element.

6. The conveyor of claim 5, in which said conveyor element comprises a sprocket length and said rotatable element comprises a sprocket wheel.

7. The conveyor of claim 4, in which said rotatable element rotates relative to cam means, said control means comprising parts operatively engaged with said cam means and moved between gripper-opening and gripper-closing positions by said cam means as said parts move relative thereto.

8. In the conveyor of claim 7, means operatively connected to said cam means for adjusting the position thereof relative to said rotatable element.

9. A conveyor comprising an elongated conveyor element, means for moving said element in a given direction along an operating station, a plurality of article-grippers extending from one side of said element and spaced therealong in said given direction, said grippers having operating elements which, when appropriately actuated, open and close said grippers, and control means at said operating station on the other side of said element from said grippers, engageable with said operating elements as their respective grippers move along said station, and effective to open and close said grippers as they move along said station, in which said conveyor element moves along a path defined in part by a peripheral portion of a rotatable element operatively engaged by said element, said control means being carried by and rotatable with said rotatable element.

10. The conveyor of claim 9, in which said conveyor element comprises a sprocket length and said rotatable element comprises a sprocket wheel.

11. The conveyor of claim 9, in which said rotatable element rotates relative to cam means, said control means comprising parts operatively engaged with said cam means and moved between gripper-opening and gripper-closing positions by said cam means as said parts move relative thereto.

12. In the conveyor of claim 11, means operatively connected to said cam means for adjusting the position thereof relative to said rotatable element.

13. A conveyor comprising an elongated conveyor element, means for moving said element in a given direction along an operating station, a plurality of article-grippers extending from one side of said element and spaced therealong in said given direction, said grippers having operating elements which, when appropriately actuated, open and close said grippers, and control means at said operating station on the other side of said element from said grippers, engageable with said operating elements as their respective grippers move along said station, and effective to open and close said grippers as they move along said station, a rotatable element rotatable relative to cam means, said control means comprising parts operatively engaged with said cam means and moved between gripper-opening and gripper-closing positions by said cam means as said parts move relative thereto.

14. In the conveyor of claim 13, means operatively connected to said cam means for adjusting the position thereof relative to said rotatable element.

* * * * *